United States Patent [19]
Takasugi

[11] Patent Number: 5,190,314
[45] Date of Patent: Mar. 2, 1993

[54] GLOVE BOX STRUCTURE OF VEHICLE

[75] Inventor: Seiji Takasugi, Higashihiroshima, Japan

[73] Assignee: Mazda Motor Corporation, Hiroshima, Japan

[21] Appl. No.: 724,400

[22] Filed: Jul. 5, 1991

[30] Foreign Application Priority Data

Jul. 4, 1990 [JP] Japan .................................. 2-175379

[51] Int. Cl.⁵ ...................... B60R 21/045; B60R 21/16
[52] U.S. Cl. .................................... 280/752; 280/732; 280/730; 296/37.12
[58] Field of Search ............... 280/732, 752, 730, 743; 180/90; 296/70, 37.12

[56] References Cited

U.S. PATENT DOCUMENTS

| | | | |
|---|---|---|---|
| 4,239,277 | 12/1980 | Oda | 296/37.12 |
| 4,893,834 | 1/1990 | Honda et al. | 280/752 |
| 4,978,136 | 12/1990 | Tomita et al. | 280/752 |
| 5,135,253 | 8/1992 | Hirashima et al. | 280/732 |

FOREIGN PATENT DOCUMENTS

| | | |
|---|---|---|
| 57-32048 | 7/1982 | Japan . |
| 61-36434 | 3/1986 | Japan . |
| 62-47437 | 3/1987 | Japan . |
| 62-90252 | 6/1987 | Japan . |
| 62-82851 | 4/1988 | Japan . |
| 0132443 | 5/1989 | Japan .................. 280/752 |
| 0182554 | 7/1990 | Japan .................. 280/732 |

Primary Examiner—Margaret A. Focarino
Assistant Examiner—Paul Dickson
Attorney, Agent, or Firm—Keck, Mahin & Cate

[57] ABSTRACT

An improved glove box structure is provided in an instrument panel in a front compartment of a vehicle, which includes a frame member, extending in a transverse direction of the vehicle body and an instrument panel, supported by the frame member. The glove box structure includes a box, having at least front and rear box walls for forming a glove box, supported for swinging movement by the instrument panel structure. The glove box moves between a closed position, in which the front box wall is located within an opening formed in the instrument panel, and an open position, in which the rear box wall is located close to the opening. A knee protector is located, outside and above a path traversed by the glove box between the closed and open positions, inside the instrument panel structure for protecting knees of a passenger upon a collision. The knee protector includes a resiliently bendable member. The bendable member is cantilevered by being mounted, at first end, to the frame member and extends towards the opening so as to place a second end within the opening. A lock is attached to the resiliently bendable member for engaging the front box wall so as to hold the glove box in the closed position.

12 Claims, 6 Drawing Sheets

GLOVE BOX STRUCTURE OF VEHICLE

The present invention relates to a glove box structure of an automobile and, more particularly, to a glove box structure with a knee protector in a dashboard of an automobile.

BACKGROUND OF THE INVENTION

1. Field of the Invention

To protect the knees of a passenger seated in a front passenger compartment during a head-on collision of an automotive vehicle, a knee protector may be installed in a space inside an instrument panel, or dashboard, structure. Such a knee protector typically includes a pair of resiliently bendable metal leaf springs secured to the instrument panel structure at a separation which should be approximately equal to a distance between the knees of a typical occupant. The metal leaf springs are resiliently bent by the passenger's knees so as to absorb the impact of the passenger's knees against the instrument panel structure upon the occurrence of a head-on collision, thereby protecting the passenger.

2. Description of Related Art

The front passenger compartment of an automobile typically includes, in the instrument panel structure, a glove compartment or glove box, such as that described in Japanese Unexamined Utility Model Publication No. 62-47437, which extends, in a widthwise direction of an instrument panel, in front of the front passenger seat and turns about a transverse axis to open towards the front passenger seat. However, a knee protector of an automotive vehicle is preferably disposed within a space traversed by the glove box as it turns between its closed and open positions. Consequently, in a typical instrument panel structure, the pair of resiliently bendable metal leaf springs can not be separated by the standard distance between knees of a passenger.

Accordingly, as is shown in FIGS. 1 and 2, a knee protector is preferably formed by a pair of resiliently bendable metal plates 5L and 5R, separately disposed on opposite sides of a glove box 4. The glove box 4 is mounted, by a hinge 3, on a lower portion of an instrument panel structure 2, supported by a cylindrical main frame 1. The main frame 1 is disposed between front pillars (not shown) and extends in a widthwise direction of a car body.

The glove box 4, having a lid portion 4a and a rear end wall portion 4b, turns or pivots about the hinge 3 to open toward a passenger seat. Curved metal plates 5L and 5R, which form springs functioning as knee protectors, are resiliently bendable and secured to the main frame 1 on transversely opposite sides of the glove box 4.

Each protective metal plate 5L or 5R has an upper end portion, welded to an outer surface of the main frame 1, and a mid portion, extending downward from the main frame and, after being bent into a substantially U-shape at a lower end thereof, towards the passenger seat. The knee protector metal plates 5L and 5R are partly located in the path followed by the rear end wall portion 4b of the glove box 4 as the glove box is moved to its open position, shown by a double dotted line in FIG. 1. The lid portion 4a of the glove box 4, which is of multi layer structure, has a rectangular reinforcement plate 6 in a cushioning enclosure 7 which is embedded in the lid portion 4a. This reinforcement 6 is disposed so as to have its opposite ends placed between the knee protector metal plates 5L and 5R, respectively, when the lid portion 4a moves towards the knee protector.

Construction of the knee protector in this way permits the knee protector metal plates 5L and 5R to receive an impact load, exerted on the lid portion of the glove box 4 by a passenger's knees, through a portion of the lid portion 4a in which the reinforcement plate 6 is provided. Consequently, knee protector metal plates 5L and 5R bend, thereby absorbing the impact load applied by the passenger's knees.

The rectangular reinforcement 6 has a large area and a transverse length similar to but a little shorter than a distance between the knee protector metal plates. Since the reinforcement 6 is embedded in the lid portion of the glove box, it is necessary to form the reinforcement from a plate having a high rigidity, resulting in an increase in weight of the lid portion 4a and a decrease in volume of the glove box 4.

SUMMARY OF THE INVENTION

The primary object of the present invention is to provide a light weight glove box lid which is sufficiently rigid but does not cause a decrease in the volume of the glove box.

It is another object of the present invention to provide a glove box with a lid causing a knee protector to provide a desired effect without particularly increasing the rigidity of an embedded reinforcement.

To achieve these and other objects, the present invention provides an improved glove box structure, which is installed in an instrument panel in the front passenger compartment of an automotive vehicle, such as a car. The instrument panel includes at least a frame member extending in a transverse direction of the car body and an instrument panel supported by the frame member. The glove box structure is formed in an opening of the instrument panel and has at least front and rear box walls for providing the glove box with a substantially rectangular top opening. The glove box is supported for swinging movement by the instrument panel structure so as to move between a closed position, in which the front box wall is located within the opening, and an open position, in which the rear box wall is located close to the opening.

Knee protection means is located outside and above the path of movement of its glove box lid, between its closed and open positions, inside the instrument panel structure. The knee protection means, which protects the knees of a passenger in the front passenger compartment, includes a resiliently bendable member, cantilevered at one end and supported by the frame member, extending towards the opening so as to place another end within the opening. The knee protection means further includes lock means, attached to the other end of the resiliently bendable member, engaged by the front box wall so as to hold the glove box in the closed position. The bendable member comprises a pair of resiliently bendable arms, disposed separately, and at what is considered to be an average distance between knees of a passenger, in the transverse direction of the vehicle.

According to a specific embodiment of the present invention, the front box wall comprises a wall member, a reinforcement embedded in the wall member and a hook member, secured to the reinforcement, which is engageable with the lock means. The reinforcement has a length in the transverse direction which is the same as the average knee distance.

According to another specific embodiment of the present invention, the glove box structure cooperates with air-bag means, supported by the resiliently bendable member, for restraining the body of the passenger during a collision of the automotive vehicle. The air bag means comprises a modular air-bag unit located above the glove box structure and secured to the knee protection means. The air bag unit includes a folded air bag and an inflator for generating compressed gas to inflate and unfold the air bag and, therefore, expand the air bag and force it through another opening, formed above the opening in the instrument panel structure. The other opening is closed by a lid structure, which comprises separately installed upper and lower lids, substantially flush with a surface of the instrument panel.

BRIEF DESCRIPTION OF THE DRAWINGS

The above and other objects and features of the invention will be apparent to those skilled in the art from the following description of preferred embodiments thereof when considered in conjunction with the accompanying drawings, in which similar reference numbers have been used to designate the same or similar elements throughout the drawings, and wherein.

DETAILED DESCRIPTION OF THE PREFERRED EMBODIMENTS

Figure 3:
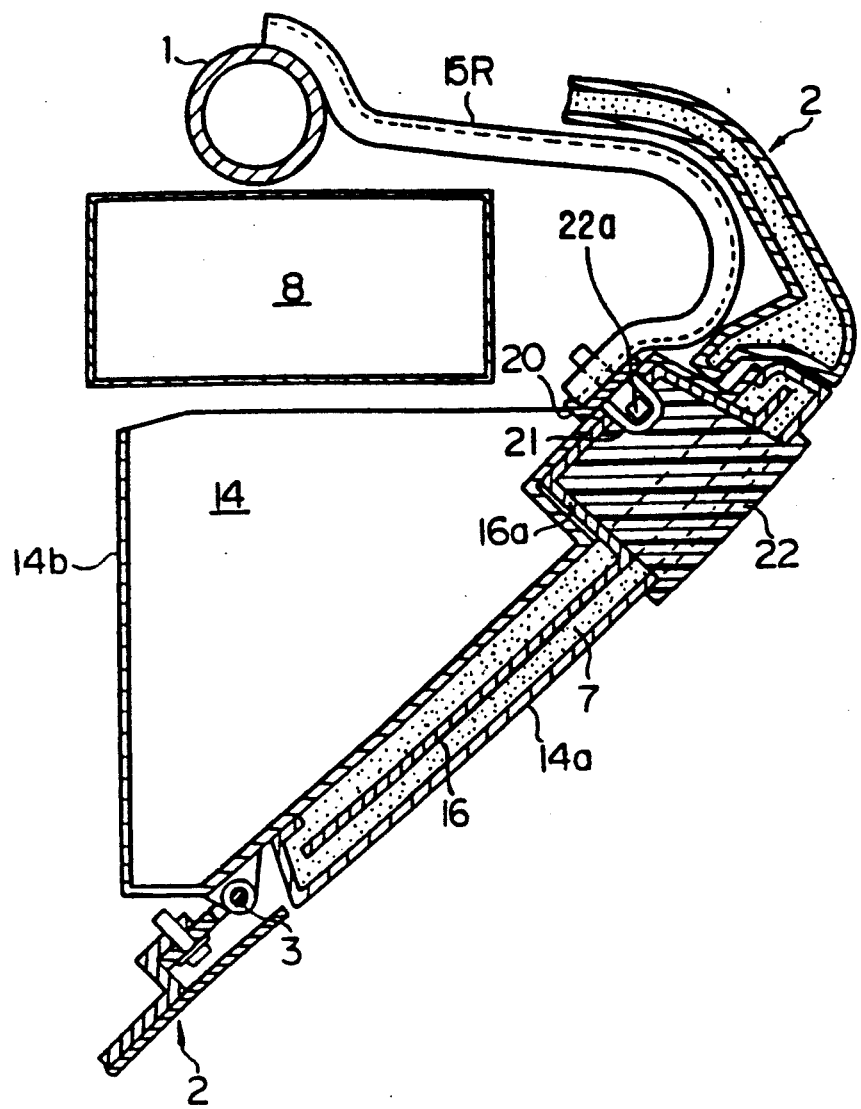
FIG. 3 is a cross-sectional view showing a glove box structure in accordance with a preferred embodiment of the present invention.
Figure 4:
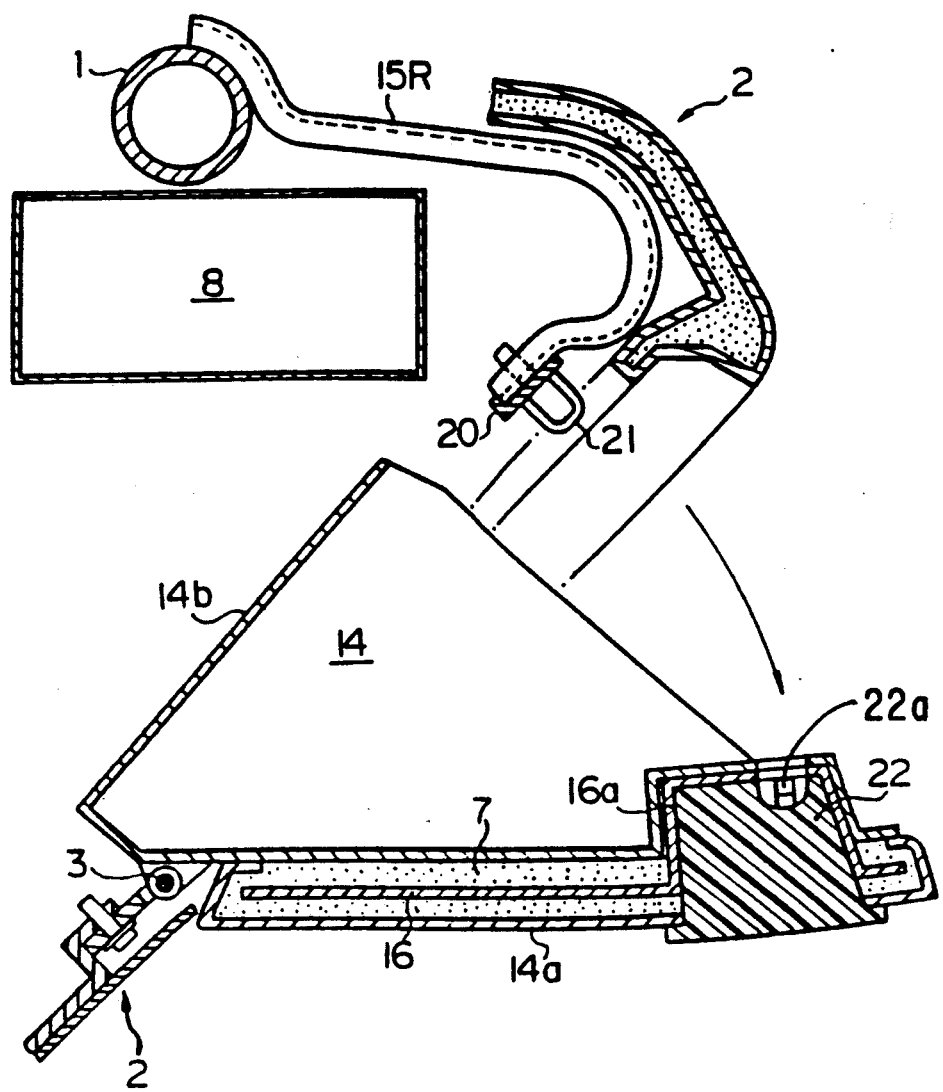
FIG. 4 is a cross-sectional view showing the glove box structure of FIG. 3 with the glove box opened.
Figure 5:
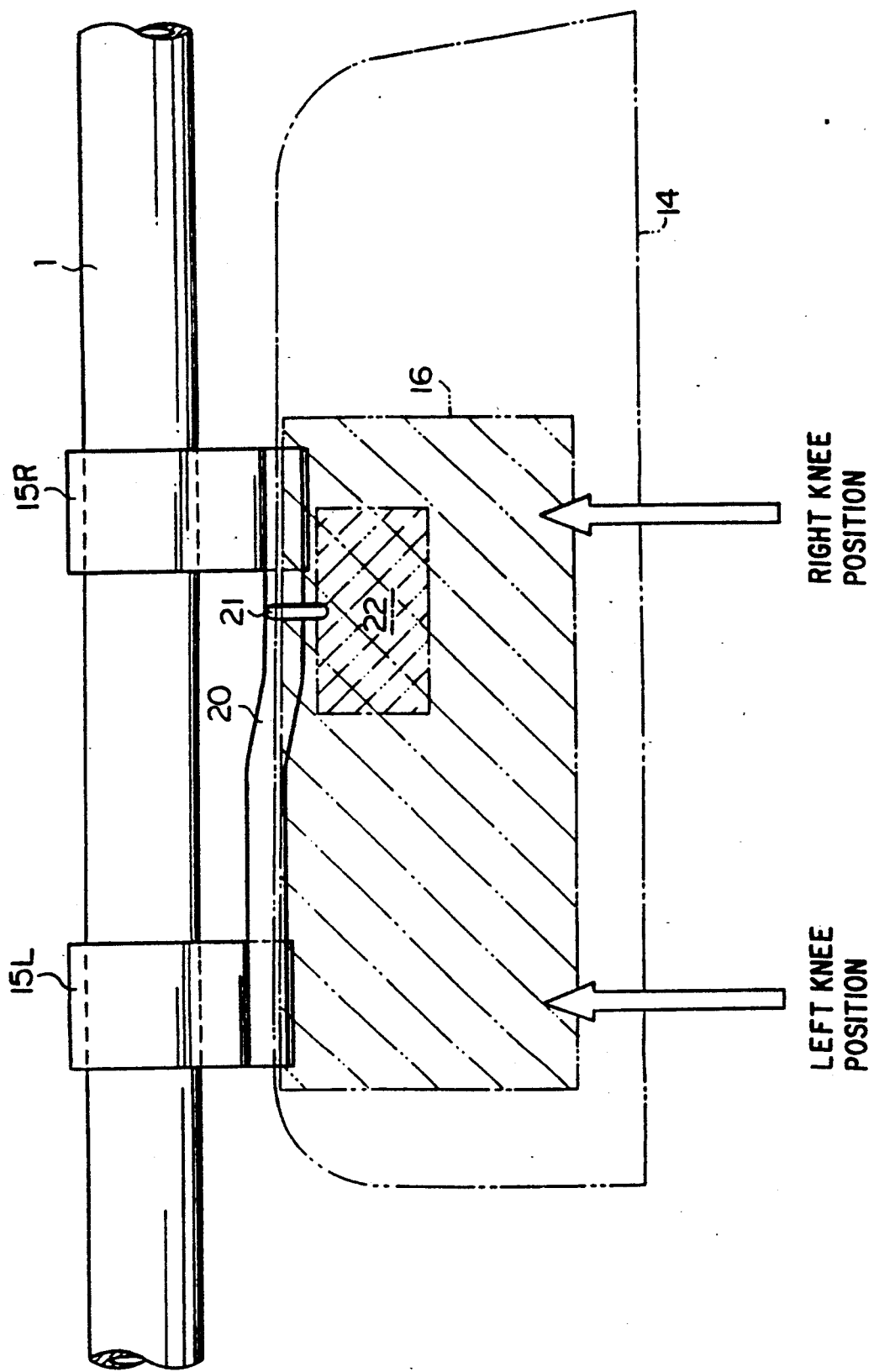
FIG. 5 is a front view of the glove box structure.

Referring to the drawings in detail, and particularly, to FIGS. 3, 4 and 5, an instrument panel structure having a glove box in accordance with a preferred embodiment of the present invention is shown. The instrument panel structure comprises a hollow cylindrical main frame 1, extending in a transverse direction of a car body and held by a pair of, namely, right and left, front pillars (not shown), and an instrument panel 2, fixedly supported, so as to extend downward, by the main frame 1. A glove box 14, having a substantially triangular or trapezoidal cross section, is supported for swinging or pivotal motion by a hinge rod 3. The glove box turns between a closed position, shown in FIG. 3, and an open position, shown in FIG. 4.

A pair of, i.e., left and right, resiliently bendable metal plates 15L and 15R, with curved lower ends, serves as knee protectors. The plates are disposed, at location away from each other, at a distance apart which is the same as the standard distance between human knees and are secured to the main flame 1 above the glove box 14. Each knee protecting metal plate 15L or 15R is welded, at its upper end, to an outer surface of a rear upper quarter section of the main frame 1, extends rearward towards a front passenger seat, and turns back downward to form a U-shape so as to approximately match an inside configuration of the instrument panel 2. The knee protecting metal plates 15L and 15R are located outside of the glove box 14 in both the closed position and the open position.

Ends of curved portions of the knee protecting metal plates 15L and 15R are interconnected by a cross member 20 with a U-shaped striker 21 secured thereto at a position near one of the knee protecting metal plates 15L and 15R. As illustrated, the striker 21 is positioned near the knee protecting metal plate 15R.

The glove box 14 has a lid wall portion 14a, which is substantially coplanar with a lower part of the instrument panel 2 when the glove box 14 is in the closed position, and a rear end wall portion 14b, which is substantially vertical when the glove box 14 is in the closed position. The lid wall portion 14a has a reinforcement plate 16 enclosed in a cushioning envelope 7 encapsulated within the lid wall portion 14a. The lid wall portion 14a is provided with a lock means 22, having a hook 22a which is engaged by the striker 21 to hold the glove box 14 in the closed position and permitting the glove box 14 to open. The lock means 22 is mechanically connected to a casing 16a formed at one end of the reinforcement plate 16 of the lid wall portion 14a.

Figure 1:
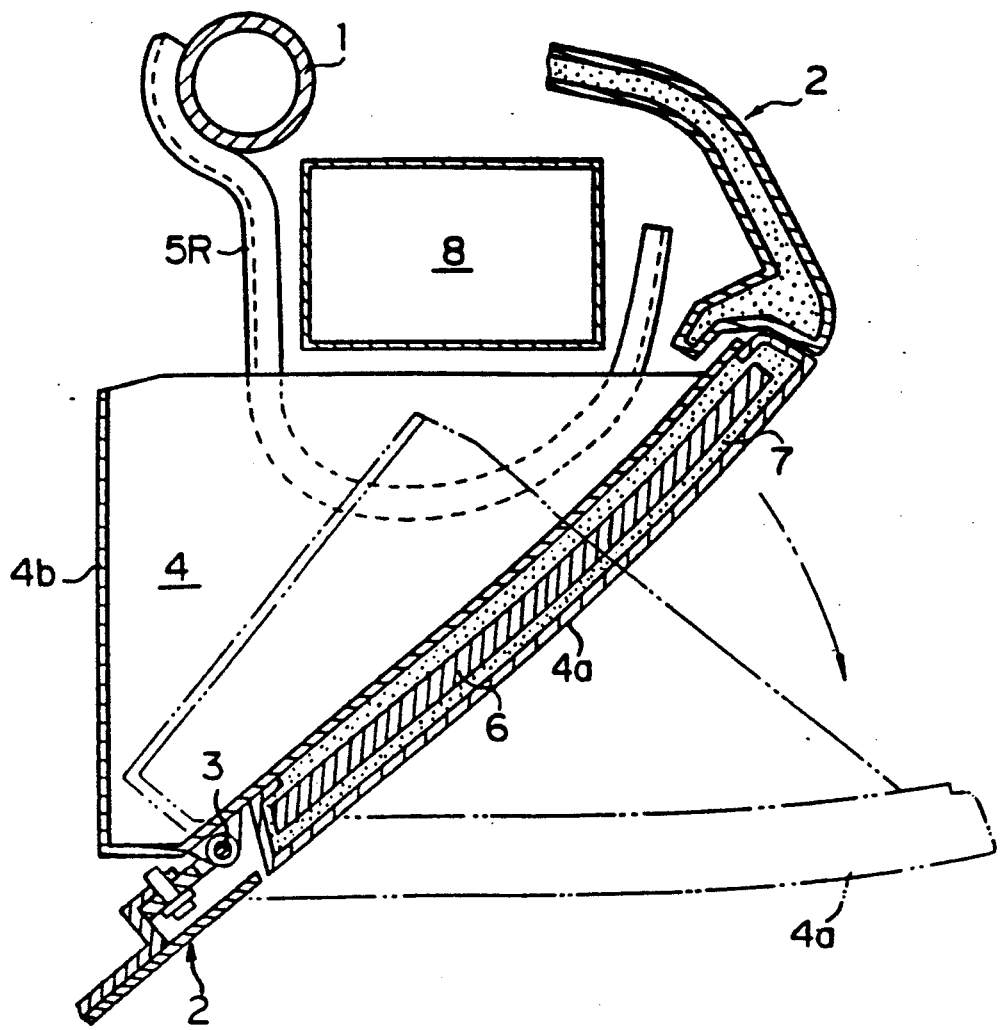
FIG. 1 is a cross-sectional view showing a prior art glove box structure.
Figure 2:
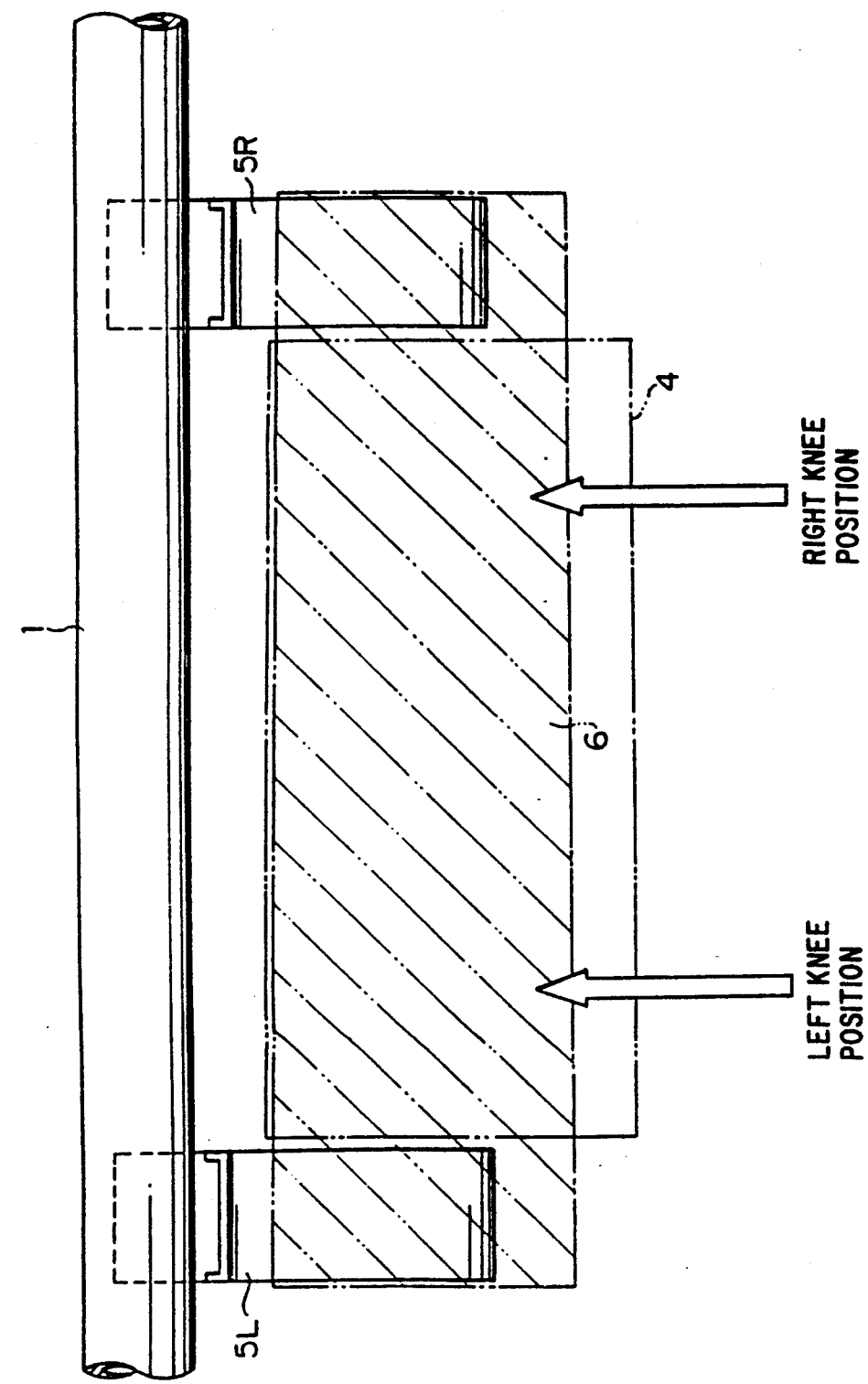
FIG. 2 is a plan view of the glove box structure of FIG. 1.

If the knees of a passenger hit and exert a shock load on the lid wall portion 14a of the glove box 14 during a head-on collision, the shock load is transmitted, to the knee protecting metal plates 15L and 15R, through the reinforcement plate 16, the lock means 22 and the cross member 20, and causes the knee protecting metal plates 15L and 15R to bend and absorb the shock load, thereby applying to the passenger's knees a substantially reduced impact load or reaction. The glove box structure of the present invention allows the reinforcement plate 16 to be made smaller than that of the conventional glove box structure shown in FIGS. 1 and 2. Since the knee protecting metal plates 15L and 15R are disposed close to the instrument panel 2, an air conditioning apparatus duct 8, if it is mounted in the instrument panel structure, can be easily oriented and installed.

Figure 6:
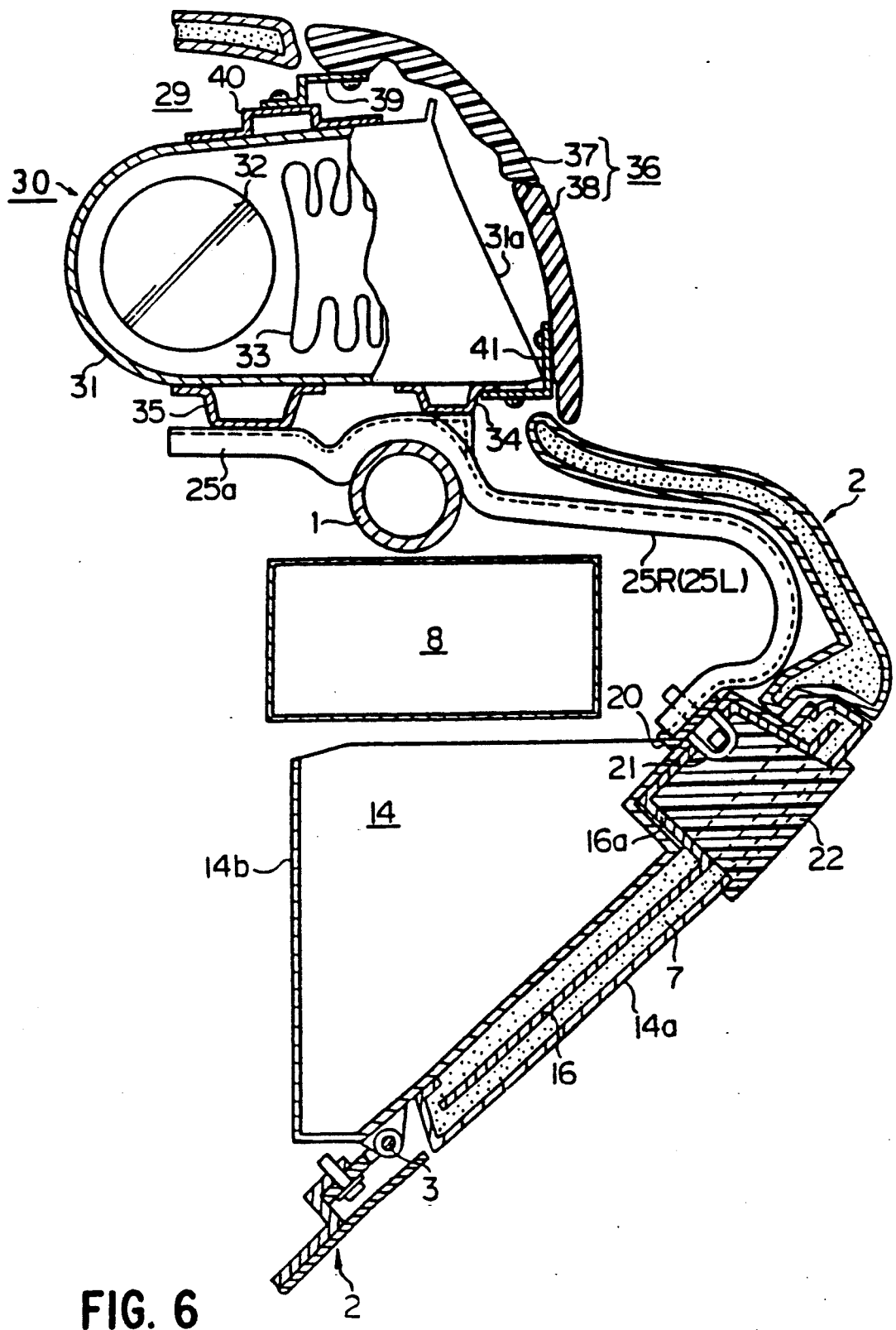
FIG. 6 is a cross-sectional view showing the glove box structure in accordance with another preferred embodiment of the present invention.

Referring to FIG. 6, illustrating a glove box structure in accordance with another preferred embodiment of the present invention, an air-bag apparatus is shown as being installed in an instrument panel structure of a car body. In this embodiment, the knee protector is substantially the same in structure and operation as the knee protector shown in FIGS. 3–5, except that each knee protecting metal plate has a front extension. That is, the knee protector has a pair of knee protecting metal plates 25L and 25R, integrally formed with front extensions 25a and firmly secured to a main frame 1.

Behind an instrument panel 2 is provided a space 29, open to a passenger compartment, for receiving a modular air-bag unit 30, which is fixedly mounted on the knee protector. The modular air-bag unit 30 comprises a module casing 31, with an opening 31a adjacent to an opening 2a formed in the instrument panel 2. The module casing 31 is provided with brackets 34 and 35 for fixedly mounting the modular air-bag unit 30 on the knee protecting metal plates 25L and 25R and the extensions 25a. The modular air-bag unit 30 further comprises an air-bag 33, folded and installed in the module casing 31, and an inflator 32 installed in the module casing. The inflator 32 generates compressed gas during a collision of the automotive vehicle so as to inflate and unfold the air-bag 33.

Installed in the opening 2a of the instrument panel 2 is an air-bag lid assembly 36. The lid assembly 36 comprises an upper lid 37, attached to the module casing 31 by a flexible upper hinge member 39 and a bracket 40 so as to open upward and close, and a lower lid 38, attached to the bracket 34 by a flexible lower hinge member 41 to open downward and close. The upper and lower lids 37 and 38 are arranged to form a substantially continuous outer surface while they are closed. As is apparent from the above description, the knee protecting metal plates 15L and 15R serve as brackets for firmly mounting the modular air-bag unit 30 on the main frame 1 without using any extra brackets.

When a head-on collision occurs and passenger's knees hit, and thereby exert a shock load on, the lid wall portion 14a of the glove box 14, the shock load is transmitted to the knee protecting metal plates 25L and 25R through the reinforcement plate 16, the lock means 22 and the cross member 20, and causes the knee protecting metal plates 25L and 25R to bend and absorb the shock load, thereby applying considerably less reaction force to the passenger's knees. Simultaneously, a collision sensor (not shown) detects a head-on collision and provides a collision signal to the modular air-bag unit 30. The inflator 32 quickly generates compressed gas in response to the collision signal, so as to inflate and expand the air-bag 33. During inflation, the air-bag 33 forces the air-bag lid assembly 36 to open the upper lid 37 upward and the lower lid 38 downward and expands into the front passenger compartment. The body of a passenger, thrown forward on the occurrence of a head-on collision, is consequently restrained. In such a way, the passenger is protected against injury in case of a collision, and in particular, a head-on collision.

It is to be understood that although the present invention has been described, in detail, with respect to preferred embodiments thereof, various other embodiments and variants, which fall within the scope and spirit of the invention, are possible. Such other embodiments and variants are intended to be covered by the following claims.

What is claimed is:

1. A glove box and knee protecting structure, installed in an instrument panel structure in a front passenger compartment of an automotive vehicle, said instrument panel structure including an opening formed therein, at least one frame member, extending in a transverse direction of a body of said automotive vehicle, and an instrument panel, supported by said frame member, comprising:

a box structure having at least a front box wall and a rear box wall for providing a glove box with a substantially rectangular top-opening, said glove box being supported for swinging movement by said instrument panel structure so as to move between a closed position, in which said front box wall is located within said opening, and an open position, in which said rear box wall is located close to said opening;

knee protecting means, located outside and above a path traversed by said glove box as it swings between said closed position and said open position, inside said instrument panel structure for protecting knees of a passenger in said front passenger compartment upon a collision of said automotive vehicle, said knee protecting means including a resiliently bendable member, cantilevered at a first end by being connected to said frame member and extending towards said opening so as to place a second end thereof within said opening; and lock means, attached to said second end of said resiliently bendable member, for holding said glove box in said closed position, said resiliently bendable member comprising a pair of resiliently bendable arms disposed separately and at a distance coinciding approximately with a distance between knees of a passenger in said transverse direction.

2. A glove box structure as recited in claim 1, wherein said front box wall comprises a wall member and a reinforcement embedded in said wall member.

3. A glove box structure as recited in claim 2, wherein said front box wall further comprises a cushioning member enveloping said reinforcement.

4. A glove box structure as recited in claim 2, wherein said reinforcement has a length, in said transverse direction, approximately the same as said distance between knees of a passenger.

5. A glove box structure as recited in claim 1, wherein said knee protecting means is formed by a pair of knee protection members, and further comprising a cross member disposed between the knee protection members and a striker for holding the glove box closed on said cross member.

6. A glove box, air bag and knee protecting structure, installed in an instrument panel structure in a front passenger compartment of an automotive vehicle, said instrument panel structure including an upper opening and a lower opening, below said upper opening, formed therein, at least one frame member, extending in a transverse direction of a body of said automotive vehicle, and an instrument panel, supported by said frame member, comprising:

a box structure having at least a front box wall and a rear box wall for providing a glove box with a substantially rectangular top-opening, said glove box being supported for swinging movement by said instrument panel structure so as to move between a closed position, in which said front box wall is located within said lower opening, and an open position, in which said rear box wall is located close to said lower opening;

knee protecting means, located outside and above a path traversed by said glove box as it swings between said closed position and said open position, inside said instrument panel structure, for protecting knees of a passenger in said front passenger compartment upon a collision of said automotive vehicle, said knee protecting means including a resiliently bendable member, cantilevered at a first end by being connected to said frame member and extending towards said lower opening so as to place a second end thereof within said lower opening;

lock means, attached to said second end of said resiliently bendable member, for holding said glove box in said closed position; and air-bag means for restraining a body of the passenger during a collision of said automotive vehicle, said air-bag means comprising a modular air-bag unit, located above said glove box structure and secured directly to said knee protecting means, including a folded air-bag and an inflator which generates compressed gas so as to inflate and unfold said air-bag to expand said air-bag and force it through said upper opening, and lid means for closing said upper opening.

7. A structure as recited in claim 6, wherein said resiliently bendable member comprises an extension, extending away from said instrument panel, for supporting thereon said modular air-bag unit.

8. A structure as recited in claim 7, wherein said resiliently bendable member comprises a pair of resiliently bendable arms disposed separately and at an approximate distance between knees of a passenger in said transverse direction.

9. A structure as recited in claim 6, wherein said lid means comprises upper and lower lids separately installed in said upper opening so as be substantially flush with a surface of said instrument panel.

10. A structure as recited in claim 6, wherein said front box wall comprises a wall member and a reinforcement, embedded in said wall member.

11. A structure as recited in claim 10, wherein said front box wall further comprises a cushioning member enveloping said reinforcement.

12. A structure as recited in claim 10, wherein said reinforcement has a length, in said transverse direction, the same as an approximate distance between knees of a passenger.

* * * * *